(12) United States Patent
Alharith

(10) Patent No.: US 12,252,955 B2
(45) Date of Patent: Mar. 18, 2025

(54) PHOTOPOLYMER CURING FOR WATER SHUT-OFF

(71) Applicant: SAUDI ARABIAN OIL COMPANY, Dhahran (SA)

(72) Inventor: Abdullah Mohammed Alharith, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/360,659

(22) Filed: Jul. 27, 2023

(65) Prior Publication Data

US 2025/0034967 A1    Jan. 30, 2025

(51) Int. Cl.
*E21B 33/138* (2006.01)
*C09K 8/44* (2006.01)

(52) U.S. Cl.
CPC ............. *E21B 33/138* (2013.01); *C09K 8/44* (2013.01)

(58) Field of Classification Search
None
See application file for complete search history.

(56) References Cited

U.S. PATENT DOCUMENTS

| | | | |
|---|---|---|---|
| 8,162,057 B2 | 4/2012 | Lewis et al. | |
| 8,215,393 B2 | 7/2012 | MacKay et al. | |
| 9,970,246 B2 | 5/2018 | Price Hoelscher et al. | |
| 10,584,274 B2 | 3/2020 | Bataweel et al. | |
| 10,865,620 B1 | 12/2020 | Ramasamy et al. | |
| 11,053,426 B2 | 7/2021 | Kalgaonkar et al. | |
| 2009/0260818 A1 | 10/2009 | Daniel et al. | |
| 2010/0247794 A1* | 9/2010 | Bailey | C08F 222/1025 427/508 |
| 2017/0247597 A1* | 8/2017 | Macchi | C09K 8/90 |
| 2022/0154548 A1 | 5/2022 | Alharith et al. | |

FOREIGN PATENT DOCUMENTS

| | | |
|---|---|---|
| CN | 114829737 A | 7/2022 |
| WO | 2016/030165 A1 | 3/2016 |
| WO | 2022/109216 A1 | 5/2022 |

OTHER PUBLICATIONS

Gebert, F. et al., "Damage-free single-mode transmission of deep-UV light in hollow-core PCF"; Optics Express; vol. 22, Issue 13; pp. 15388-15396; Jun. 30, 2014 (9 pages).

(Continued)

*Primary Examiner* — Andrew Sue-Ako
(74) *Attorney, Agent, or Firm* — Osha Bergman Watanabe & Burton LLP

(57) ABSTRACT

A system and method for treatment of a subterranean formation are provided. The treatment includes pumping a water shut-off material into a wellbore and to a target zone in the subterranean formation and pumping a photo-curable polymer material to the target zone behind the water shut-off material, thereby forming a layer of photo-curable polymer material between the water shut-off material and the wellbore. An energy source may be directed to the layer of photo-curable polymer material until the layer of polymer solidifies to yield a solid barrier between the water shut-off material and the wellbore.

16 Claims, 5 Drawing Sheets

(56) References Cited

OTHER PUBLICATIONS

Guangdong Newbest Testing Service, "Safety Data Sheet for Chemical Products ( SDS )"; Report No. NB20171027100E(R1); pp. 1-10; Nov. 24, 2017 (10 pages).
International Search Report issued for corresponding international patent application No. PCT/US2024/038466, mailed Oct. 31, 2024 (6 pages).
Written Opinion issued for corresponding international patent application No. PCT/US2024/038466, mailed Oct. 31, 2024 (8 pages).
A.G. Rodriguez-Hernandez, et al., "3D printer waste, a new source of nanoplastic pollutants," Environmental Pollution, 2020 (9 pages).

* cited by examiner

PHOTOPOLYMER CURING FOR WATER SHUT-OFF

BACKGROUND

Controlling water production from oil producing wells is an increasingly important goal in the oil industry. Subterranean passages of water may be present in the operation of wells used in the recovery of hydrocarbons. These water passages may severely disrupt or terminate the desired operation of a well by mixing water with the hydrocarbons (oil) and producing a product with a high water cut. The presence of water in hydrocarbon production may be a result of weak reservoir formations due to fractures connecting the water zone with the oil-producing zone, water coning due to a high pressure differential between water and oil zones, and water flooding operations. In water flooding operations, water is injected into a well to mobilize the oil in the matrix toward the well and maintain, or increase, pressure in the reservoir. This injected water may end up in the production stream due to open features, high permeability formations, and other influences that divert water towards a production stream. Other factors that may cause water production include micro-cracks in cement sheets, closeness of perforations to the water zone, and high oil/water viscosity ratio.

Oil reservoirs with high water cut produce oil with high water content, adversely impacting most stages of the oil production. Excessive water production may decrease well production performance, increase operating costs, enhance the presence of scales, corrosion, and degradation in the field facilities, incur costs of liquid handling facilities, tubing pipeline erosion, broken sand control, and high power consumption. While high water cut may affect most wells, mature wells are particularly vulnerable due, in part, to depleting oil supply and limitations on the mature equipment.

Although it may be difficult (and not necessary) to completely shut-off water production in a well to keep the well economically viable, it is desirable to be able to control the water production so that the rate of oil production is not impacted by the water presence in the well.

Conventional water shut-off treatments may implement mechanical treatment techniques to prevent high cut water production. Mechanical water shut-off treatments may include plugs, packers, and tubing patches. Plugs and packers may expand small diameter elements downhole into larger diameter, thereby creating a seal and isolating the well from unwanted features or zones. Mechanical methods may also include drilling horizontal, multi-lateral wells, and placing a linear to block.

Water shut-off treatments may also be performed by chemical techniques. Conventionally, a water shut-off material is used to prevent high water cut. The water shut-off material blocks the flow from the water passage to the well by creating a plug.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a process for a treatment of a subterranean formation. The process may include pumping a water shut-off material into a wellbore and to a target zone in the subterranean formation. The process may also include pumping a photo-curable polymer material to the target zone behind the water shut-off material, thereby forming a layer of photo-curable polymer material between the water shut-off material and the wellbore. Then, an energy source may be directed to the layer of photo-curable polymer material until the layer of photo-curable polymer material solidifies to yield a solid barrier between the water shut-off material and the wellbore, thereby preventing flowback of the water shut-off material from the target zone.

In another aspect, embodiments disclosed herein relate to a system for a treatment of a subterranean formation. The system may include a wellbore extending through the subterranean formation and a water shut-off material configured to block a fluid from entering a wellbore. The system may also include a sealant material between the water shut-off material and the wellbore, where the sealant material is a photo-curable polymer material. The system may also include an energy source configured to direct energy to the sealant material and configured to promote crosslinking of the sealant to form a solid barrier between the water shut-off material and the wellbore.

Other aspects and advantages of the claimed subject matter will be apparent from the following description and the appended claims.

DETAILED DESCRIPTION

Figure 1:
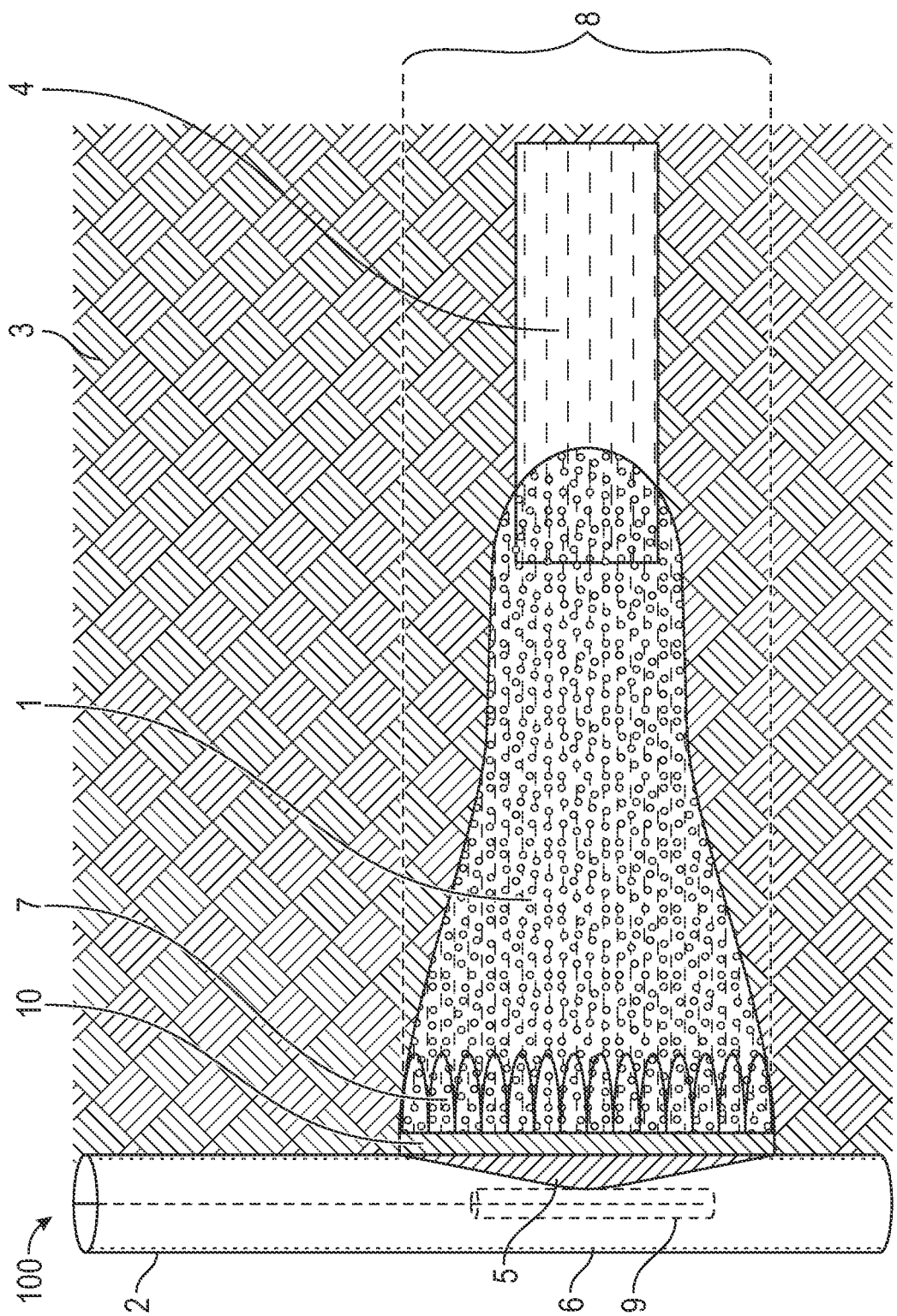
FIG. 1 is a schematic of a subterranean well system according to embodiments of the present disclosure.

Embodiments of the present disclosure are directed at preventing flowback of water shut-off materials into wellbores. In particular, water shut-off material may be enclosed with a photo-curable polymer material treated with a UV light emitting device to create a solid barrier to contain the water shut-off material within the reservoir.

In particular, embodiments disclosed herein provide a method in which the water shut-off material is held in place by the photo-curable polymer material during the time the water shut-off material is injected into the target zone and the time it solidifies with enough mechanical strength to remain in the target zone. Embodiment methods may also use a photo-curable polymer material to shield the water shut-off material in the event the water shut-off material degrades (with time and/or temperature) thereby possessing insufficient mechanical strength to operate as a reliable permanent plug. Thus, the photo-curable polymer material may keep the water shut-off material in the target zone to prevent the water shut-off material from flowback, either during the solidification process or in the event of water shut-off degradation.

As such, embodiments disclosed herein relate to a process for a treatment of a subterranean formation. The process includes pumping a water shut-off material into a wellbore and to a target zone in the subterranean formation. Then, a photo-curable polymer material is pumped to the target zone behind the water shut-off material, thereby forming a layer of photo-curable polymer material between the water shut-off material and the wellbore. Finally, an energy source is directed to the layer of photo-curable polymer material until the layer of polymer solidifies to yield a solid barrier between the water shut-off material and the wellbore.

The problem of water presence in wells is generally solved using techniques adapted to cover, seal or otherwise plug openings, thereby shutting off or reducing the passage of water into the wellbore. Reducing excessive water production typically starts with locating the points of water entry, evaluating the water flow and heterogeneity of the reservoir rock, and the schematics of the wellbore. Advanced production tools such as production logging tools and fiber optic technology, may be used to accurately identify and access the subterranean water characteristics. Water production data and the identification of production zones informs where to target a water shut-off treatment.

Water shut-off treatments in accordance with the present disclosure may be performed by chemical techniques. Chemical water shut-off treatments may lead to an improved conformance in the reservoir as well as a potentially permanent blocking of unwanted water production zones. Chemical treatments close the paths of least resistance (e.g., open features) that direct water to the wellbore by reducing the permeability of these paths. The area of possible unwanted water flow to a wellbore is called a target zone. Chemical water shut-off treatments may also direct water to sweep oil from the matrix rock, thereby improving the oil production. Chemical treatments may also move between layers and features of the matrix, to reach and close distant target zones. Chemical treatment operations may be designed based on the characteristics of the reservoirs, the chemical properties of the reservoir and water shut-off material, and the placement accuracy of the injected chemicals. Examples of chemical treatments for water shut-off operations in accordance with one or more embodiments include utilizing resins, solid particles, foams, polymer flooding, and gel injections.

In accordance with one or more particular embodiments of the present disclosure, chemical gel injection is used for water shut-off operations in wells. As noted above, methods in accordance with the present disclosure include pumping a water shut-off material into a wellbore and to a target zone to be treated. Such chemical gel injection water shut-off techniques are effective in reducing the permeability of undesirable zones (target zones) and improving sweep efficiency. Examples of gel polymer systems used as water shut-off materials include polymers such as polyacrylamide with different degrees of hydrolysis (e.g., partially hydrolyzed polyacrylamide) and polysaccharide such as xanthan biopolymer. The polymers may be cross-linked with metallic and organic cross-linkers to produce a three-dimensional polymer structure of the gel.

Gel polymer systems may be composed of a water-soluble polymer gel and a crosslinking agent dissolved in an aqueous solution. The polymer gel system may also include preformed gels and foamed gels. While gel polymer systems employed in conventional water shut-off methods may be attractive and potentially permanent methods to reduce high water cut, gel polymer treatments may be difficult to control, particularly during the solidification/gelation time in the target zone. As described below, the photo-curable polymer material used in combination with the polymer gel water shut-off material provides a more predictable and ultimately more effective water shut-off treatment than polymer gel materials alone.

Gel injection operations may include three stages: modeling, designing, and executing. In modeling, available information about the reservoir and the well may be gathered, such as the reservoir parameters, water entry points, drilling operation reports, and production history. However, the precision required to determine the physical and chemical characteristics of the water producing layers in the area of the wellbore may not be enough to reliably predict the gelling process of the water shut-off material.

In designing, the information about the reservoir and well is used to design the properties of the water shut-off material, such as a polymer gel fluid. The properties of the polymer gel may include the gel's viscosity, the nature of the gel phase (e.g., aqueous phase), gel density, and injection time.

In executing gel injection, the polymer gel is injected into the target zone. Longer gelation time leads to a greater likelihood of a successful water shut-off operation because it allows for the gelant to solidify and seal off large features and least resistant paths. After allowing sufficient time, the gel sets into a solid mass, and behaves as a flow diverting or blocking agent.

Gelation/solidification of the water shut-off material can vary from several hours to several days. As such, if used without the photo-curable polymer, the water shut-off material is difficult to enclose and maintain in the target zone due to the physics of gelling under shear stress, as well as the chemistry of the polymer gels in aqueous solutions. High temperature and pressure zones may increase the time it takes for the polymer gel systems to solidify, thereby increasing the potential for flowback into the well. Gel strength enhancers, such as cement and silica, may be used in the water shut-off material matrix to enhance the strength of the gelant, particularly in high temperature conditions. However, the strength enhancers do not prevent the gelant from flowback into the well after placement and prior to gelation/solidification.

These water shut-off materials require time to solidify to stay in place. Without the implementation of the present embodiments, the viscous water shut-off material may seep into the well before it solidifies, potentially leading to a failure to block water from entering the production stream, the presence of the water shut-off material in the production stream, and a water shut-off material blockage in the wellbore. Thus, it is desirable to prevent flowback of the water shut-off material, such as a polymer gel, after placement in the target zone using the photo-curable polymer described herein. Water shut-off material flowback may compromise the integrity and strength of the water shut-off material since it may change the overall volume and placement of the injected water shut-off material in the target zone. Design parameters of a water shut-off operation may require set amount of water shut-off material in the target zone to be effective in blocking the flow of water. Loss of water shut-off material due to flowback may result in an overall failure of the water shut-off operation. Flowback may also compromise well production. The water shut-off material may flow into the well, thereby impeding or blocking the flow of hydrocarbons through the well and causing costly repairs, or well closure.

Embodiments of the present disclosure may provide the desired support for the water shut-off material to stay in the target zone of the near wellbore formation. According to embodiments of the present disclosure, saturated near wellbore formations may be treated with a sealant material to prevent chemical water shut-off material from flowback from the treated (target) zone. A sealant material may be injected into the near wellbore region of the target zone to form a layer of sealant material in the porous media between the water shut-off material and the wellbore. In embodiments of the present disclosure, the sealant material may be a photo-curable polymer material.

As noted above, methods in accordance with the present disclosure include pumping a water shut-off material to a target zone and then pumping a photo-curable polymer material to the target zone behind the water shut-off material. In such embodiments, the photo-curable polymer material and water shut-off material may be disposed within the rock matrix of a near wellbore formation, and the water shut-off material may extend from the near wellbore formation into the far wellbore formation or adjacent a water zone. In some embodiments of the present disclosure, the photo-curable polymer material may form a layer extending from the wellbore formation to the near wellbore formation. For example, in one or more embodiments, the photo-curable polymer material may extend into the formation from 0.5 to 2 cm from the wellbore wall.

The photo-curable polymer material is composed of precursor materials that are stable, meaning they do not polymerize under downhole conditions until exposed to an energy source as described below. The photo-curable polymer material is able to be polymerized upon exposure to the energy source due to the presence of a photoinitiator in the photo-curable polymer material. Upon exposure to the energy source, the polymer material may polymerize and thereby harden at a controlled rate to form the previously described cured polymer layer. In one or more embodiments of the present disclosure, the photo-curable polymer material is comprised of precursors including monomers and/or oligomers that polymerize to form a polymer with the aid of a photo initiator. Examples of types of suitable monomers and oligomers include epoxy monomers, epoxy oligomers, acrylic monomers, and acrylic oligomers. Examples include polyurethane acrylate oligomer, isobornyacrylate monomer, hexanedioldiacrylate monomer, and di-trimethylolpropanetetra-acrylate monomer.

In one or more embodiments of the present disclosure, the photo-curable polymer material also includes a photoinitiator. Suitable types of photoinitiators include free radical photoinitiators. Examples of specific photoinitiators that may be used include hydroxylalkylphenones, α-amino ketones, and acylphosphine oxides. The photoinitiator may be present in an amount ranging from 2% to 5% by weight, based on the total amount of monomers and oligomers in the photo-curable polymer material.

In one or more embodiments of the present disclosure, the photo-curable polymer material may possess a viscosity of less than 250 cP (centipoise) before exposure to the energy source.

In some embodiments of the present disclosure, an energy source, such as a UV light emitting device, may be used to treat the photo-curable polymer material in the wellbore. An amount of photo-curable polymer material may be injected into the porous rock matrix behind the water shut-off material in the target zone to form a layer of the material between the water shut-off material and the wellbore. Once the photo-curable polymer material forms a layer between the exposed portion of the water shut-off material and the wellbore, a UV light emitting device may be lowered into the wellbore. The UV light emitting device interacts with the photoinitiator thereby triggering polymerization of and crosslinking of the photo-curable polymer material into a solid barrier. The emitted UV light may depend on parameters of the UV light emitting device, including the wavelength and intensity of light emitted from the UV light emitting device. The treated photo-curable polymer material may act as a spacer to shield the in-situ water shut-off chemicals, from flowing back into the wellbore. The treated photo-curable polymer material may also plug and enclose the in-situ water shut-off material. By shielding or enclosing the water shut-off material with the light-treated photo-curable polymer material, the water shut-off material may be prevented from flowing from the target placement and provide the water shut-off material the time necessary to solidify and become immobile. The length of time required for the UV light emitting device to solidify the photo-curable polymer material may vary, depending on the design and conditions present in the wellbore, and may be less than five minutes.

FIG. 1 depicts a subterranean well system 100 in accordance with one or more embodiments. As shown in FIG. 1, subterranean well system 100 may be a subterranean wellbore 2 used in hydrocarbon production operations. The subterranean wellbore 2 may be lined with a casing 6. The subterranean wellbore 2 is shown as a vertical cased well, however it will be understood by those skilled in the art that the subterranean wellbore 2 may be open hole, angled or slanted, horizontal, or a multilateral well. Perforations 7 may extend through the sidewall of the casing 6. The perforations 7 may vary in size and may be penetrated by aqueous fluids, including water, water shut-off material, and photo-curable polymer material according to the present disclosure. The perforations 7 may be in fluid communication with fractures and/or a fracture network that extend into the reservoir formation 3.

As shown the subterranean well system 100 in FIG. 1, water shut-off material 1 may be placed via injection operations into the reservoir formation 3 to block the flow of water from the water zone 4 to the wellbore 2 and near wellbore 2. Injection operations may include pumping the water shut-off material down the wellbore 2 and into a target zone of the reservoir formation 3. The water shut-off material 1 may be pumped until the water shut-off material 1 permeates into the water zone 4. The water shut-off material 1 prevents the water zone from extending into the near wellbore 2 area by permeating and solidifying in the spaces in the reservation formation 3. An exposed portion 8 of the water shut-off material may be disposed along the length of a portion of the wellbore 2. As used herein "exposed" refers to the portion of the water shut-off material that is in the near-wellbore region of the formation or otherwise subject to potentially flowback into the wellbore during gelation or solidification of the water shut-off material.

In conventional systems, after the water shut-off material 1 is injected into the reservoir formation 3 and before it solidifies, the water shut-off material 1 may seep back into the wellbore 2, particularly along the exposed area 8. To prevent flowback to the wellbore 2 along the exposed portion 8, a photo-curable polymer material 10 is injected along exposed portion 8 after the placement of the water shut-off material 1 is complete. The photo-curable polymer material 10 is injected via a pumping operation. The photo-curable polymer material 10 may be disposed in a way that completely shields or encloses the water shut-off material 1 from the wellbore 2, thereby creating a barrier between the water shut-off material 1 and the wellbore 2.

According to embodiments of the present disclosure, a UV light emitting downhole tool 9 may be used to direct UV light 5 to promote polymerization and crosslinking of the photo-curable polymer material 10. As the photo-curable polymer material 10 crosslinks, the photo-curable polymer material solidifies to form a seal. The time required for the UV light emitting downhole tool to create the photo-curable polymer seal, or curing time, may be negligible to several minutes, depending on the identity of the polymer material and wellbore conditions. The curing time of the photo-curable polymer material 10 may depend on the parameters of the UV light emitting downhole tool 9, including the wavelength and intensity of the direct light 5.

Figure 2:
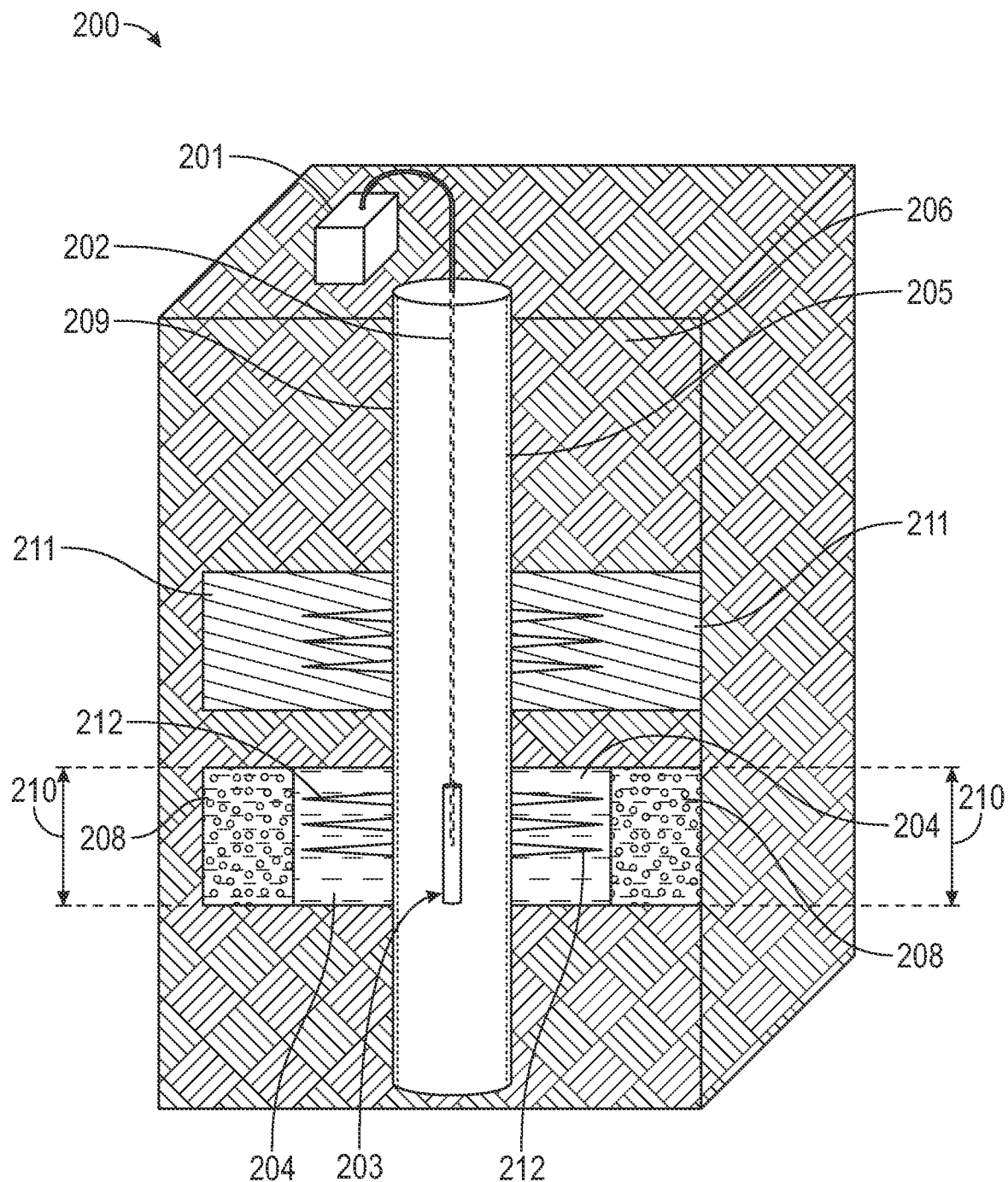
FIG. 2 is a schematic of a subterranean well system according to embodiments of the present disclosure.

FIG. 2 shows a schematic representation of water shut-off operation 200 with a photo-curable polymer sealant of the present disclosure. As shown in FIG. 2, water shut-off material 208 is pumped into a target zone 210. The target zone 210 is the area wherein water may enter the production operation through fractures (not shown) in the reservoir 206 and perforations 212 in the wellbore casing 205. The perforations 212 may extend into the reservoir 206. As shown in FIG. 2, water shut-off material 208 is pumped below an oil producing zone 211. This may be the case in water coning where water builds up below an oil producing zone. In some embodiments, photo-curable polymer material 204 is pumped immediately after the water shut-off material 208 is in place in the target zone 210. The photo-curable polymer material 204 permeates the matrix of the reservoir 206 between the water shut-off material 208 and the wellbore 209. In some embodiments of the present disclosure, the photo-curable polymer material 204 may overlap with the water shut-off material 208.

As shown in FIG. 2, some embodiments of the present disclosure may include lowering a UV light emitting downhole tool 203 from a UV light generation unit 201 via a fiber optic wire 202. The UV light generation unit 201 controls the generation of the UV light, including the wavelength, strength and location of the UV light. The UV light emitting downhole tool 203 directs UV light to the photo-curable polymer material 204. The photo-curable polymer material 204 may permeate into a portion of the wellbore casing 205 and into the reservoir 206 to create a barrier between the water shut-off material 208 and the wellbore 209. The UV light emitting downhole tool 203 directs UV light via a generator to the photo-curable polymer material solution 204 along the target zone 210 of the wellbore 209. The target zone 210 is the area wherein high water cut occurs in the production operation. The UV light emitting downhole tool 203 is configured to treat the photo-curable polymer material 204 in the target zone 210 by directing UV light to a portion of the target zone 210 and rotating the UV light emitting downhole tool 203 to promote crosslinking of the photo-curable polymer material 204 in a radial progression. The UV light emitting downhole tool 203 may also direct UV light radially, promoting the crosslinking of the photo-curable polymer material around the target zone 210.

Figure 3:
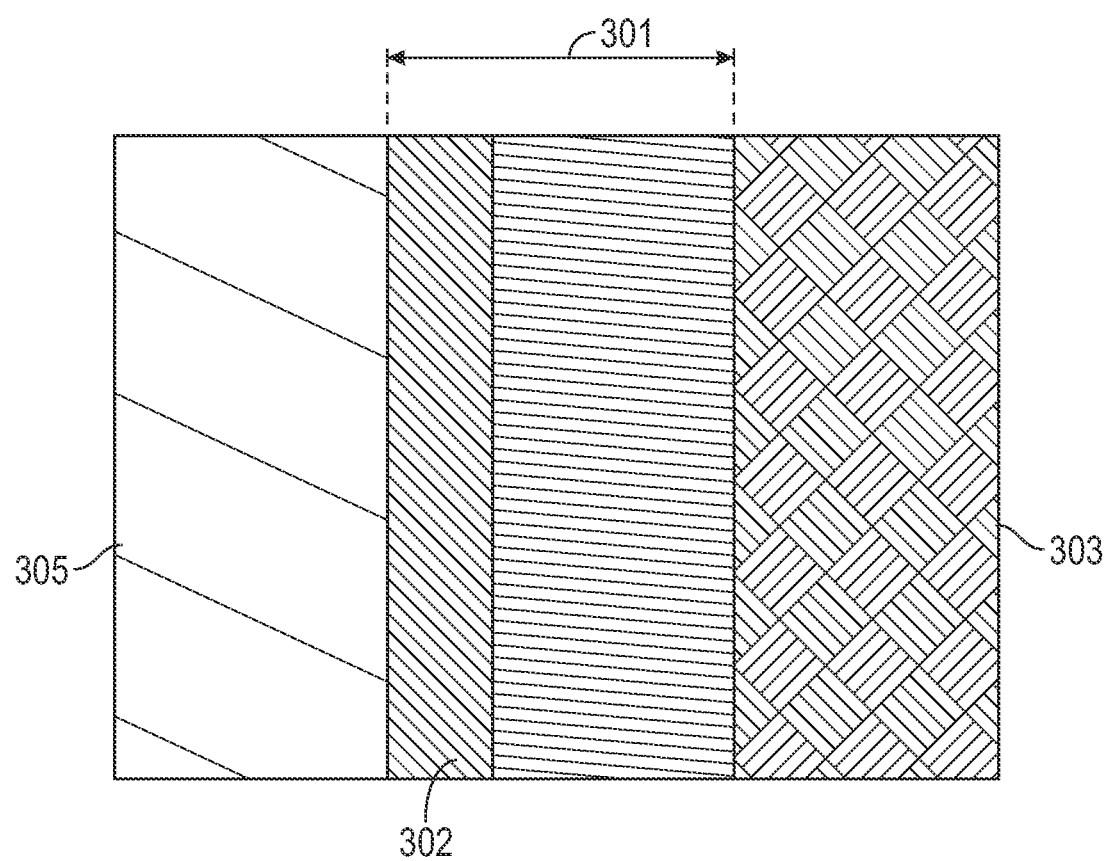
FIG. 3 is a cross section of a wellbore and reservoir formation according to embodiments of the present disclosure.

FIG. 3 shows a cross section of water shut-off operation 300 with a photo-curable polymer sealant of the present disclosure. The UV light produced by the UV light emitting downhole tool (203 in FIG. 2) causes the photo-curable polymer in the photo-curable polymer material (204 in FIG. 2) to polymerize and crosslink and form a solid polymer layer 301 between the opening of the wellbore 305 and the water shut-off material 303 in a high watercut zone. The solid polymer layer 301 may be present in the wellbore casing 302 and may reach the water shut-off material 303. Once the solid polymer layer 301 forms, the UV light emitting downhole tool (203 in FIG. 2) is removed from the wellbore 305. In some embodiments of the present disclosure, the solid polymer layer 301 may extend from the wellbore to the near wellbore and may be up to 2 cm thick.

Although FIG. 3 shows a single solid polymer layer 301 disposed next to the water shut-off material 303, some embodiments of the present disclosure may include unreacted photo-curable polymer material between the solid polymer layer 301 and the water shut-off material 303.

According to embodiments of the present disclosure, the solid polymer layer as shown in FIG. 3 may remain in place in the wellbore until the water shut-off material completes the solidification process. Once the water shut-off material is completely solid/gelled, the water shut-off mater may semi-permanently or permanently block water flow into the wellbore through fractures and perforations. At that point, the solid polymer layer may be allowed to decompose or it may be kept in place depending on the needs of the production operation. Thus, it is envisioned that there is no need to remove or decompose the solid polymer layer.

EXAMPLE

Figure 4A:
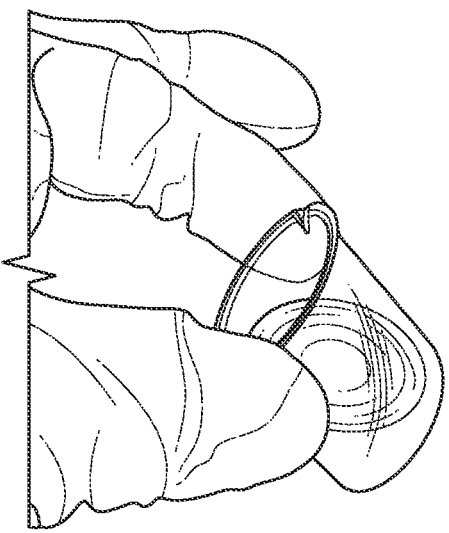
FIG. 4a is an image highlighting the results of the example below, showing the photo-curable polymer material prior to curing.
Figure 4B:
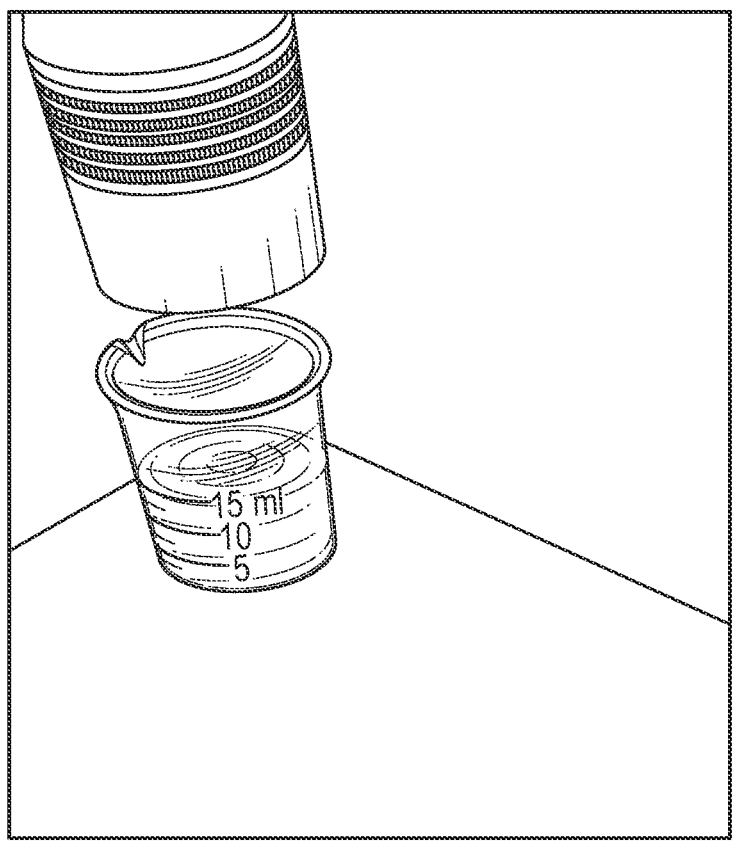
FIG. 4b is an image highlighting the results of the example below, showing the curing process of the photo-curable polymer material.
Figure 4C:
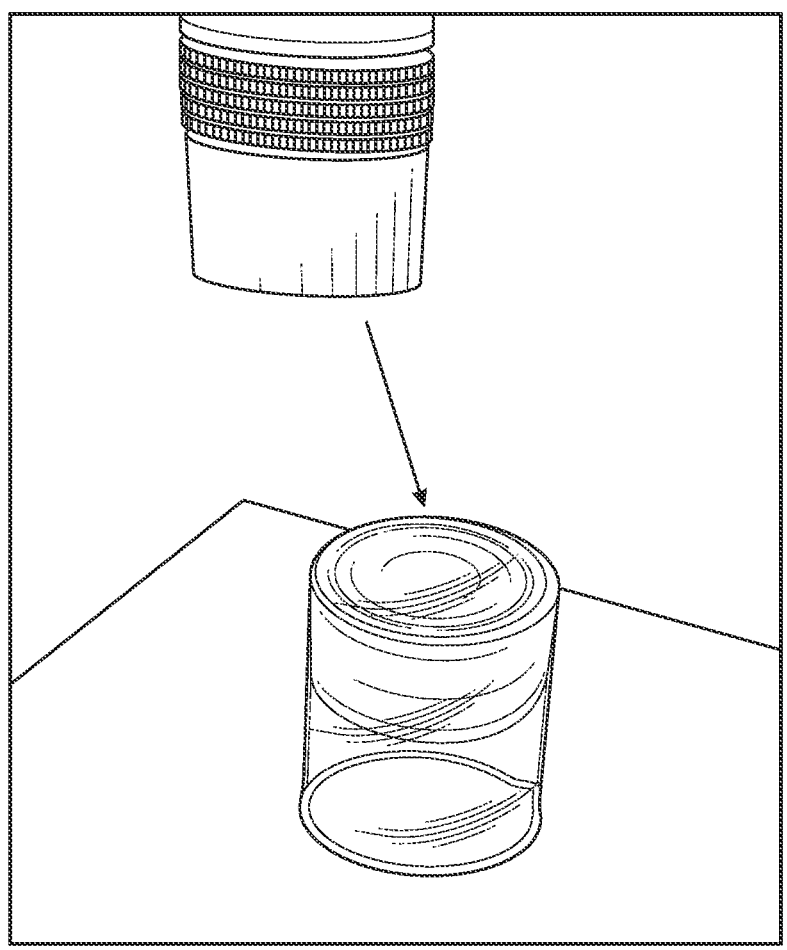
FIG. 4c is an image highlighting the results of the example below, showing the solid photo-curable polymer material after curing.

Laboratory tests were conducted to determine the plugging potential of the photo-curable polymer material. The material used in the examples is a ready-mix 3D Printing UV Sensitive Resin manufactured by Shenzhen AnyCubic Technology, and includes 55% by weight polyurethane acrylate oligomer, 40% by weight acrylate monomer, and 5% by weight photoinitiator. At room temperature, the photo-curable polymer material is a liquid, as shown in FIG. 4a. The photo-curable polymer material was then exposed to UV light, with a wavelength of 395 nm, for 20 seconds, as shown in FIG. 4b. After exposure to the UV light, a solid polymer was formed, as shown in FIG. 4c.

In some embodiments of the present disclosure, the photo-curable polymer material and then solid polymer may be used as a spacer to hold in-situ water shut-off chemical from encroaching into the wellbore prior to solidification.

Embodiments of the present disclosure may provide at least one of the following advantages. Embodiments of the present disclosure prevent water shut-off material from seeping (flowback) out of the target zone and into the wellbore. The water shut-off material blocks water from entering the wellbore and creating a high water cut product. Embodiments of the present disclosure may stabilize the water shut-off material after placement in the target zone and during gelation time. The water shut-off material requires time for solidification/gelation once in the target zone. The solid polymer layer in embodiments of the present disclosure holds the water shut-off material in place, providing the time necessary for the water shut-off material to immobilize in the target zone. Also, embodiments of the present disclosure may create a stable static barrier between the water shut-off material and the well, particularly during gelation time of the water shut-off material.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A process for a treatment of a subterranean formation, comprising:
   pumping a water shut-off material into a wellbore and to a target zone in the subterranean formation;
   pumping a photo-curable polymer material comprising a precursor material and a photoinitiator to the target zone behind the water shut-off material, thereby forming a layer of photo-curable polymer material between the water shut-off material and the wellbore, wherein the photo-curable polymer material extends into the subterranean formation from 0.5 to up to 2 cm from the wellbore; and
   directing an energy source comprising a UV light emitting device to the layer of photo-curable polymer material until the layer of photo-curable polymer material solidifies to yield a solid barrier between the water shut-off material and the wellbore, thereby preventing flowback of the water shut-off material from the target zone.

2. The process of claim 1, wherein the water shut-off material is a polymer gel.

3. The method of claim 2, wherein the polymer gel comprises a polyacrylamide, a polysaccharide, or any combination thereof.

4. The process of claim 1, wherein the precursor material comprises epoxy monomers, epoxy oligomers, acrylic monomers, acrylic oligomers, and combinations thereof.

5. The process of claim 4, wherein the photo-curable polymer material possesses a viscosity of less than 250 centipoise before exposure to the energy source.

6. The process of claim 1, wherein the photoinitiator is present in an amount of 2 to 5 weight % based on the total amount of the precursor material in the photo-curable polymer material.

7. The process of claim 1, further comprising lowering the energy source into the wellbore to the target zone.

8. The process of claim 1, wherein the photo-curable polymer material solidifies in less than 5 minutes upon exposure to the energy source.

9. A system for a treatment of a subterranean formation, comprising:
   a wellbore extending through the subterranean formation;
   a water shut-off material, configured to block a fluid from entering a wellbore;
   a sealant material comprising a precursor material and a photoinitiator between the water shut-off material and the wellbore, wherein the sealant material is a photo-curable polymer material; and
   an energy source comprising a UV light emitting device configured to direct energy to the sealant material and promote crosslinking of the sealant material to form a solid barrier between the water shut-off material and the wellbore,
   wherein the sealant material extends into the subterranean formation from 0.5 to up to 2 cm from the wellbore.

10. The system of claim 9, further comprising a water shut-off material pump configured to pump the water shut-off material into the wellbore to a target zone.

11. The system of claim 9, further comprising a sealant pump configured to pump the sealant material into the wellbore to a target zone.

12. The system of claim 1, further comprising a UV generation unit configured to control the generation of UV light in the wellbore.

13. The system of claim 9, wherein the precursor material comprises epoxy monomers, epoxy oligomers, acrylic monomers, acrylic oligomers, and combinations thereof.

14. The system of claim 9, wherein the photoinitiator is present in an amount of 2 to 5 weight % based on the total amount of monomers and oligomers in the photo-curable polymer material.

15. The system of claim 9, wherein the photo-curable polymer material solidifies in less than 5 minutes upon exposure to the energy source.

16. The system of claim 9, wherein the water shut-off material comprises a water soluble polymer gel comprising a polyacrylamide, a polysaccharide, or any combination thereof.

* * * * *